United States Patent [19]

Lenhardt

[11] Patent Number: 4,826,547

[45] Date of Patent: May 2, 1989

[54] PROCESS FOR SEALING SPACE BETWEEN PANES OF INSULATING GLASS AND TOOL THEREFOR

[75] Inventor: Karl Lenhardt, Neuhasen-Hamberg, Fed. Rep. of Germany

[73] Assignee: Lenhardt Maschinenbau GmbH, Neuhausen-Hamberg, Fed. Rep. of Germany

[21] Appl. No.: 91,508

[22] Filed: Aug. 31, 1987

[30] Foreign Application Priority Data

Aug. 30, 1986 [DE] Fed. Rep. of Germany ....... 3629614
Sep. 24, 1986 [DE] Fed. Rep. of Germany ....... 3632327

[51] Int. Cl.$^4$ .............................................. C03C 27/10
[52] U.S. Cl. .................................... 156/109; 118/108; 156/107; 156/244.22; 156/500

[58] Field of Search ................ 118/108; 156/107, 109, 156/244.27, 500

[56] References Cited

U.S. PATENT DOCUMENTS 4,711,692 12/1987 Lisec .............................. 156/109 X

FOREIGN PATENT DOCUMENTS 3408688 6/1985 Fed. Rep. of Germany .

*Primary Examiner*—Robert A. Dawson
*Attorney, Agent, or Firm*—Balogh, Osann, Kramer, Dvorak, Genova & Traub

[57] ABSTRACT

A procedure that, with the help of at least one sealing nozzle (7) and at least one covering and stripping plate (10), permits the defect-free and bubble free filling of panes of insulating glass (1) with a paste-like sealing mass, even in the corner areas, is described.

15 Claims, 7 Drawing Sheets

PROCESS FOR SEALING SPACE BETWEEN PANES OF INSULATING GLASS AND TOOL THEREFOR

Figure 1:
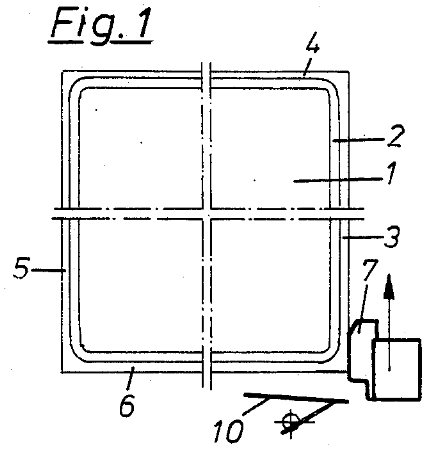

The present invention relats to a process that embodies the distinguishing features as set out in the specification.

Such a process is known, for example, from DE-OS No. 34 08 688. In sealing systems that operate to a large extent automatically, as are known, for example, from DE-PS No. 28 16 437 or from DE-PS No. 28 45 475, sealing the corner areas of the insulating glass panes causes particular problems. In these sealing systems, one or a plurality of sealing nozzles are moved along the edge of an insulating glass pane and inject a paste like sealing mass such as THIOKOL (which is a condensation product obtained by the reaction of dihalogenated aliphatic compositions and soluble polysulfides), into the edge gaps of said panes. When this is done, the sealing nozzles lie against the edge of both the panes of glass, which define the edge join, and the nozzle orifice, from which the sealing mass emerges, is directed towards the distance piece by which the two panes of glass are cemented to each other. As long as a sealing nozzle is not in the immediate vicinity of a corner of the insulating glass panel, filling the edge gap evenly with the sealing mass and the obtaining a smooth surface of the sealing mass, which does not project beyond the edge of the panes, presents no problem, for the front of the sealing nozzle covers the edge gap locally and smoothes the sealing mass. This is not the case when sealing panes of insulating glass at their corner areas, for the edge join is open in two planes that are perpendicular to each other. Thus, in order to achieve a smooth termination of the sealing mass in the corner area and to prevent the sealing mass that has already been applied from being torn out of the edge join by the relative movement between the pane of insulating glass and the sealing nozzle, DE-OS No. 34 08 688 proposes that at three corners of the pane of insulating glass the section of the edge join section that is adjacent to the section of the edge join that has been sealed by a sealing nozzle be covered over by a cover and stripping plate that closes off the section of the edge gap that has just been sealed by the sealing nozzle. According to this, the sealing nozzle moves to this plate during the sealing process, and then its front end slides over and beyond the edge of the plate that lies on the corner of the pane. This ensures that when the sealing nozzle moves beyond the corner in question it does not pull a part of the tacky sealing mass that is adhering to the front of the sealing nozzle out of the edge join once again. What happens is that the sealing mass is stripped from the front of the sealing nozzle by the edge of the plate and is then held in the gap. At the same time the plate prevents the fact that even during injection of the ssealing mass into the edge gap immediately prior to reaching a corner a part of the sealing mass escapes at the adjacent section of the edge gap that is not closed off by the sealing nozzle and which would be open without such a plate. In order that the plate itself does not pull sealing mass from the edge gap, it is withdrawn from its edge obliquely to the pane of insulating glass.

However, the problems that occur when sealing the corner areas of panes of insulating glass are not covered completely by the cover and stripping plate that is known from DE-OS No. 34 08 688. There is a danger that when a sealing nozzle has sealed a section of edge gap and begins to seal the adjacent section of edge gap, the sealing mass that emerges from the sealing nozzle under pressure will force a portion of the sealing mass out of the already sealed edge gap so that there will still be sealing mass protruding in the corner area of the pane of insulating glass, and this surplus will have to be removed by hand. In addition, practical experience has shown the using the method known from DE-OS No. 34 08 688 it is difficult to fill the edge gap in the corner areas with sealing mass completely, i.e., in such a manner that it is free of bubbles. This particularly difficult to do if stand-off frames, wherein the corners are formed by bending and are thus rounded to a specific radius, are used in the panes of insulating glass, so that the edge gaps in the corner area are somewhat deeper than in the area outside the rounded corners of the stand-off frame.

It is the task of the present invention to describe a process for sealing rectangular panes of insulating glass, said process being suitable for use in automatic sealing systems, and which results in edge gaps that are completely filled in the corner areas but without any excess sealing mass protruding, so that it is possible to eliminate any subsequent work to remove such an excess.

This task has been solved by a process having the features set out hereinbelow.

In contrast to the prior art cited in DE-OS No. 34 08 688, according to the present invention, when sealing all four corners of the pane of insulating glass the edge gap section that has just been sealed, proceeding from the particular corner, one covers a piece one piece wide that starts from the particular corner with a covering and stripping plate, and fills the corner area of the edge gap that is tightly covered by the nozzle and the covering and stripping plate that abuts against the nozzle with sealing mass. Thus, when the first edge gap section of a pane of insulating glass is filled with sealing mass by a sealing nozzle, and the sealing nozzle approaches the end of this section of edge gap, the adjoining section of edge gap in the area of the common corner is not covered over by a covering and stripping plate; such a covering and stripping plate is applied to the edge gap section that was sealed first, whereupon when the corner area is reached, the ejection of sealing mass from the sealing nozzle is interrupted and the sealing nozzle is removed from the first section of edge gap; in the area of this same corner, this same sealing nozzle, or another sealing nozzle, is positioned on the adjacent section of edge gap and begins to seal this, starting from the corner, whereupon the covering and stripping plate that has been applied to the previously sealed edge gap section ensures that sufficient pressure to ensure bubble-free sealing can build up in the corner area of the edge gap without any undesired excess of sealing mass forming on the previously sealed section of the edge gap. In this connection, it is required that the sealing nozzle and the covering and stripping plate should cover the edge gap tightly one piece wide; this means covering that is so tight that it prevents the paste-like sealing mass from squeezing out, but lets air escape, so that the air that is forced out of the corner area of the edge gap during the sealing process can escape to the atmosphere.

The sealing process can proceed in a similar manner for the second and third corners of the pane of insulating glass. A special feature characterizes the fourth and final corner of the pane of insulating glass, for when the sealing nozzle approaches the final corner when sealing the fourth and final section of the edge gap, the other section of the edge gap that is associated with the last corner has already been sealed; thus, it would serve no useful purpose to proceed at this corner as at the others and, when the corner is reached, remove the sealing nozzle from the section of edge joint that was last sealed and apply it to the adjacent section of edge joint, since only the area of this final corner remains to be sealed. In order to seal the last corner, it is far more efficient to leave the sealing nozzle on the last sealed section of edge joint and apply the covering and sealing plate to the adjacent section of edge joint. A corresponding sequence of the sealing process is described in DE-OS No. 34 08 688 for sealing the final corner of a pane of insulating glass, although this does not provided details of a systematic procedure such as is to be protected by this patent application. In contrast to the teachings of the present invention, the teachings of DE-OS No. 343 08 688 state that each time a sealing nozzle approaches a corner, the covering and sealing plate is applied to the adjoining section of the edge gap, so that the sealing nozzle runs against the edge of the covering and sealing plate. For this reason, according to the teachings of DE-OS No. 34 08 688 no covering and stripping plate is provided for one of the corners of the pane of insulating glass, because this involves that corner that is not an end point, but only a starting point for the sealing process for both the edge gap sections that meet in this corner. The fact that during the sealing of the last end gap section and the last corner according to DE-OS No. 34 08 688 the covering and stripping plate is lying on an already sealed edge gap section is an unavoidable consequence of the fact that what is involved is the last corner, but not the consequence of a deliberate deviation from the type and manner of sealing the pane of insulating glass in the area of the other corners, as is proposed by the present invention.

The present invention differs from the prior art described by DE-OS No. 34 08 688 in that on sealing all four corners of the pane of insulating glass the sealing nozzle remains stationary relative to the pane of insulating glass when it is filling the covered corner area with the sealing mass, and in that only after this is the covering and stripping removed. In contrast thereto, in the prior art the sealing mass only emerges from the sealing nozzle as long as said nozzle is moved relative to the pane of insulating glass, and since this movement proceeds essentially uniformly it is scarcely possible to install the precise quantity of sealing mass required to fill completely the edge gap in the corner area of a pane of insulating glass, particularly when the edge gap is especially deep at this point because a curved stand-off frame is used. However, if —as is proposed by the present invention—the corner area of the edge gap is sealed with a stationary sealing nozzle, then it becomes possible to control the quantity of sealing agent that is delivered, and thus the degree to which the edge gap is sealed in the corner area at a nominally constant feed output of the pump that is used to move the sealing agent, simply by adjusting the time span for which the sealing nozzle, which is resting on the edge of the pane of insulating glass, is allowed to remain open. In an automatic sealing system, the commands needed to do this can be supplied from a control program. However, it is also possible to measure the width and the depth of the particular edge gap by means of sensors that are associated with the sealing nozzle and which precede this, and then control the sealing nozzle as a function of these measured values. Such sensors are part of the prior art, and reference is made to DE-OS No. 32 17 410 in this connection.

Only when the edge gap in the area of a corner has been sealed in this manner, in so far as they are covered by the sealing nozzle and the covering and stripping plate adjacent thereto, is the covering and stripping plate removed from the edge of the pane of insulating glass. When the sealing nozzle then continues to seal that section of the edge gap against which it is adjacent, no disadvantageous changes in the surface of the sealing mass occur in the corner area. In the prior art as it emerges from DE-OS No. 34 08 688 this is different because there the so-called covering and stripping plate is already removed from the edge of the pane of insulating glass in the area under consideration, before the sealing nozzle is applied to the second of the two edge gap sections that meet at that point and continues with the sealing process.

When sealing one of the four edge gap sections, it is preferred that the ejection of the sealing mass from the sealing nozzle be interrupted shortly before the sealing nozzle reaches the end of the section of edge gap, so that the string of the sealing mass does not extend right up to the end of the edge gap section. This entails the advantage that the sealing nozzle, which is subsequently released from this section of edge gap, moves around the corner, for example, and is then applied to the adjacent section of edge gap, does not pull any sealing mass, which could otherwise contaminate the pane of insulating glass, out of the edge gap. A further advantage in such a method lies in the fact that in the corner area of the edge gap there is initially a large space which, during subsequent filling of the corner area with a sealing nozzle that is stationary relative to the pane of insulating glass, can be filled more easily but with no excess than would be the case if, as in the prior art, this free space were not there.

In a corresponding manner, the sealing of the first section of edge gap in a pane of insulating glass is preferably started shortly after the beginning of this section of edge gap.

In each case, however, the distance from the end of an edge gap section at which a string of the sealing mass ends must so match the length of the covering and stripping plate that the covering and stripping plate covers the remaining free space in the edge gap section completely.

If the sealing nozzle and the covering and stripping plate are positioned to seal a pane of insulating glass in the area of one of its corners, the covering and stripping plate could first be placed in the position in which it lies on the edge of the pane of insulating glass in the previously sealed edge gap section, and the sealing nozzle could then be positioned on the adjacent edge gap section. Since, however, the covering and stripping plate should abut on the front of the nozzle, it is more favourable to first bring the sealing nozzle to its sealing position, in which it is at rest, and then bring the covering and stripping plate to its covering position, in which it rests against the front of the nozzle. When this is done, it is preferred that one proceeds such that one first puts the covering and stripping plate a little ahead of the front of the sealing nozzle and then allows it to slide along the edge until it comes to rest against the sealing nozzle. This ensures, on the one hand, that the sealing nozzle and the covering and stripping plate together close off the corner area of the edge gap tightly; on the other hand, the covering and stripping plate can smooth the already filled sealing mass whilst it glides along the edge of the pane of insulating glass.

If, when sealing the pane of insulating glass in the area of its corners, one wishes to ensure that the corner area of the edge gap is filled completely and without bubbles, then it is recommended that a quantity of sealing mass that is greater than the space in the edge gap covered by the covering and stripping plate be allowed to emerge from the stationary sealing nozzle, so that a portion of the sealing mass will penetrate into the as yet unsealed section of edge gap that is in front of the sealing nozzle. If one then begins the relative motion between the sealing nozzle and the pane of insulating glass so as to fill this section of edge gap, it is preferred that the ejection of the sealing mass from the sealing nozzle be started after some time lag, this being done so as to avoid overfilling the edge gap in this section. Such a method is only indicated for the first, second and third corners, of course, but not when sealing the last corner, for there is sealing mass in both the adjacent edge gap sections at this point.

According to the process according to the present invention, panes of insulating glass can be sealed when in any position. Suitable for carrying out the process, for example, are apparatuses in which the panes of insulating glass are sealed when lying flat (DE-OS No. 23 09 295, DE-OS No. 28 45 475, DE-OS No. 29 07 210), or such in which they are sealed on a horizontal conveyor, leaning against a support (e.g., DE-OS No. 28 16 437 or DE-OS No. 28 46 785), providing one provides the required covering and stripping plate and ensures that the process is carried out according to the present invention. Suitable for carrying out the process according to the present invention is a tool arrangement consisting of a sealing nozzle and a covering and stripping plate, in which the latter is arranged on a carrier that follows the motion of the sealing nozzle, for example, in such a manner that the covering and sealing plate and the sealing nozzle are arranged on a common carrier. This entails the advantage that the sealing nozzle, which moves along the edge of the pane of insulating glass, always takes the covering and stripping plate, in conjunction with which it works when sealing the edge gaps in the corner area, with it. Since the covering and stripping plate is only to be applied to the edge of the pane of insulating glass in the corner area, it is advantageous that it be movable on its carrier at right angles to the plane of the pane of insulating glass and in the plane of the pane of insulating glass. By this means it is possible to keep the covering and stripping plate at a distance from the pane of insulating glass while the sealing nozzle moves relative to the pane of insulating glass.

It is preferred that the covering and stripping plate consist of a part that is intended to rest on the edge of the pane of insulating glass and a spring arm that can be swung out to project from this at an acute angle, on the projecting arm of which an activating device for the covering and stripping plate acts transversely to its contact surface, with the tip of that acute angle being oriented towards the sealing nozzle. In particular, in the case of the covering and stripping plate, this can be a metal sheet from which an arm is cut and bent to form an acute angle, or an acute-angled angle plate that is formed in some other way. This configuration entails the advantage that the covering and stripping plate, when moved against the edge of the pane of insulating glass by the activating system, which can be, for example, a piston-cylinder unit, will rest and be sprung against the edge of the pane of insulating glass and at the same time—because of the reduction of the acute angle that takes place—will glide along the edge of the pane of insulating glass, until it comes to rest on the front of the sealing nozzle. In this way, the tight sealing of the corner area of the edge gap is achieved for the smallest cost. A further advantage entailed in the use of an angle plate as a covering and stripping plate lies in the fact that if this is sufficiently soft, this can twist a little and can thus come to rest on the edge of both individual panes of glass, if their edges do not line up precisely. It is even better, however, to ensure that the covering and stripping plate is pressed more firmly against the pane from which it is moved last during a particular stripping process. By this means it is possible to ensure that even when this edge lies behind the line of the correspondinge edge of the adjacent individual pane within the pane of insulating glass, because of a lack of precision in production, the covering and stripping plate lies with sufficient pressure on both edges of the pane of glass, so that no sealing mass is drawn out of the edge gap over the edge of the pane of glass that does not protrude as far; the covering and stripping plate will be moved cleanly on the outer edge of the edge of the pane of glass that protrudes less.

The advantageous effect is achieved very easily by a development of the tool arrangement in that the part that is intended to rest on the edge of the pane of insulating glass subtends an angle of other than 90° with its flat front and the plane of the pane of insulating glass, this being done in such a manner that the section of the part which is at the front relative to the direction of withdrawal on removal from the edge of the pane of insulating glass, directly before being applied on the edge of the pane of insulating glass (see FIG. 3) lies closer to the edge of the pane of insulating glass than to the section of the part which is farther back relative to the direction of withdrawal. This development of the tool arrangement is particularly suitable in combination with a covering and stripping plate that is formed as an angle plate.

An embodiment of the present invention is shown in the drawings appended hereto, which show the following:

FIGS. 1 to 12 An example of sealing a pane of insulating glass with the help of two sealing nozzles and two covering and stripping plates, these showing the sequence of movements of the sealing nozzles and the covering and stripping plates in all phases of the sealing process.

FIGS. 13 to 16: At larger scale, the sequence of movements of a sealing nozzle and of the associated covering and stripping plate when sealing the edge gap in a corner area.

Figure 17:
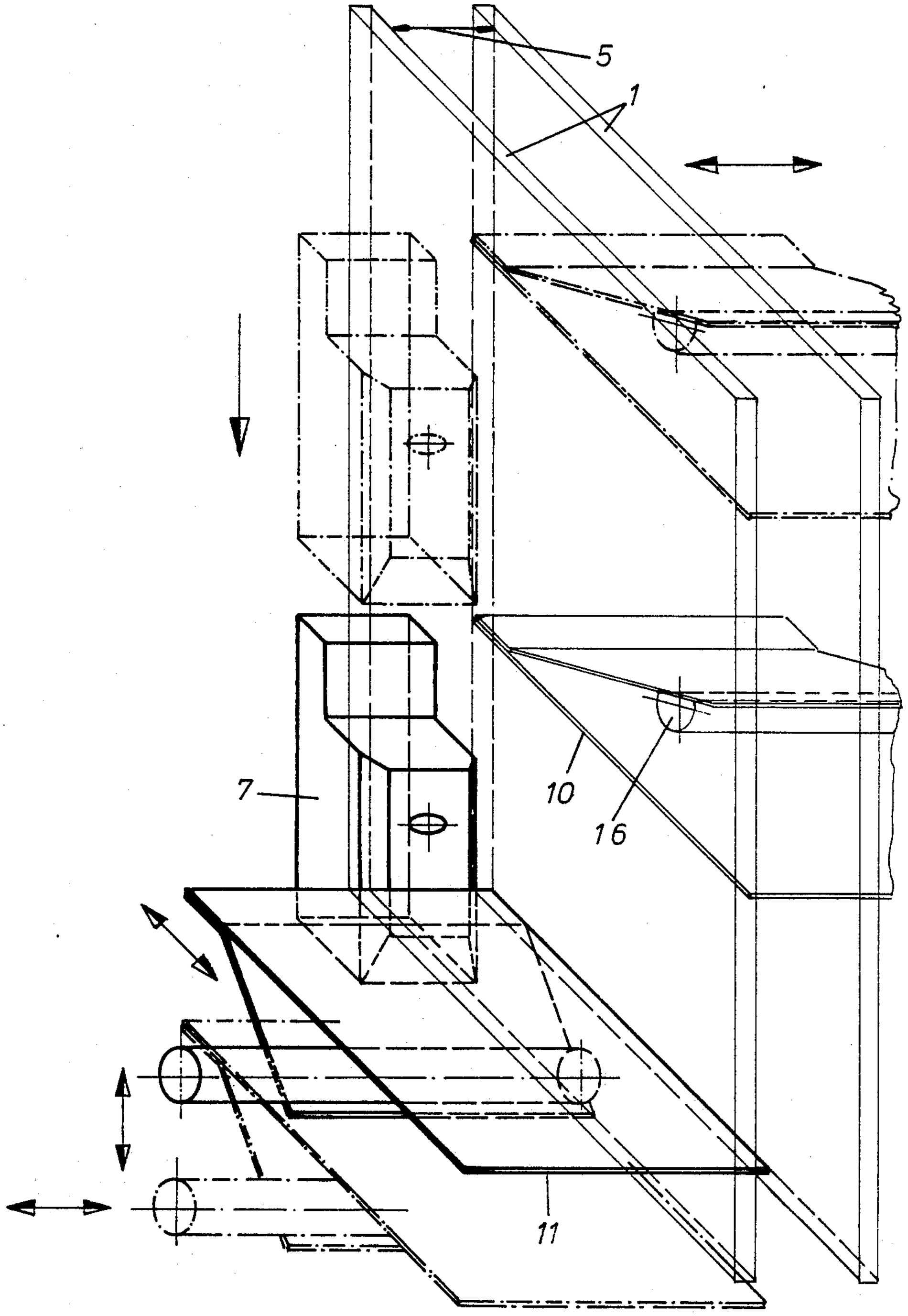

FIG. 17: An enlarged, isometric view of the arrangement of the sealing nozzle and of the covering and stripping plate on the pane of insulating glass, to seal the edge gap in the area of the last corner.

Figure 18:
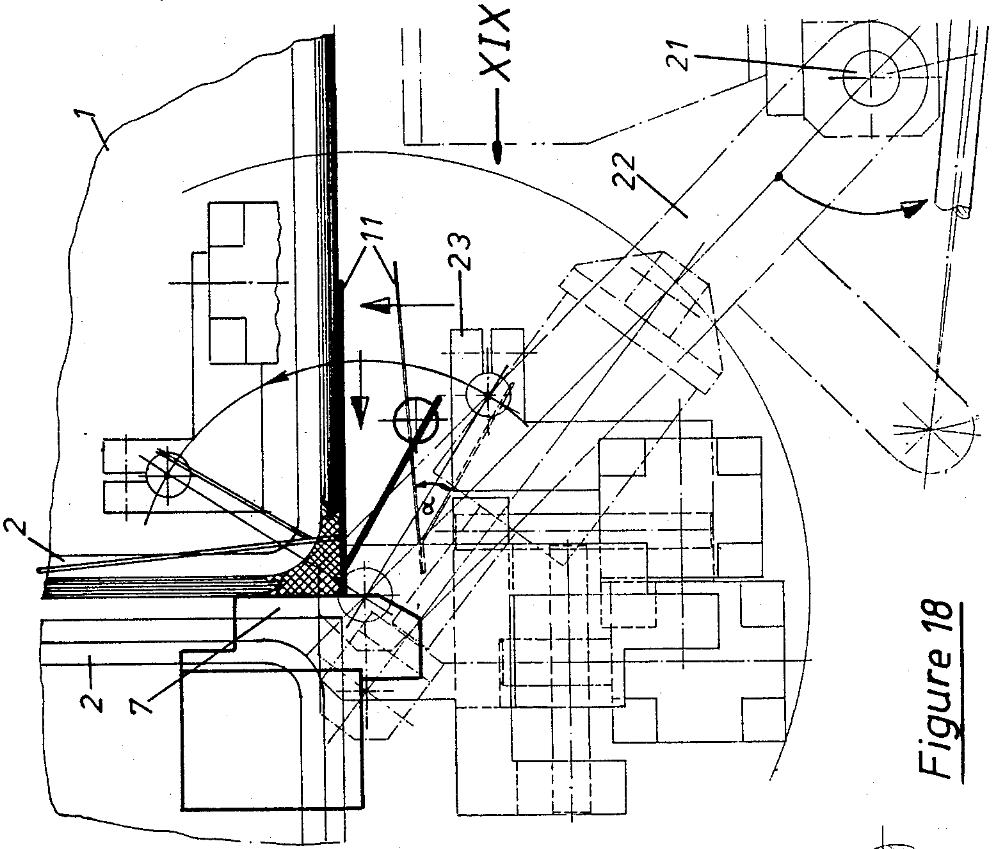

FIG. 18: A side view of the arrangement of the sealing nozzle and of the covering and stripping plate when sealing the edge gap in the area of the last corner.

Figure 19:
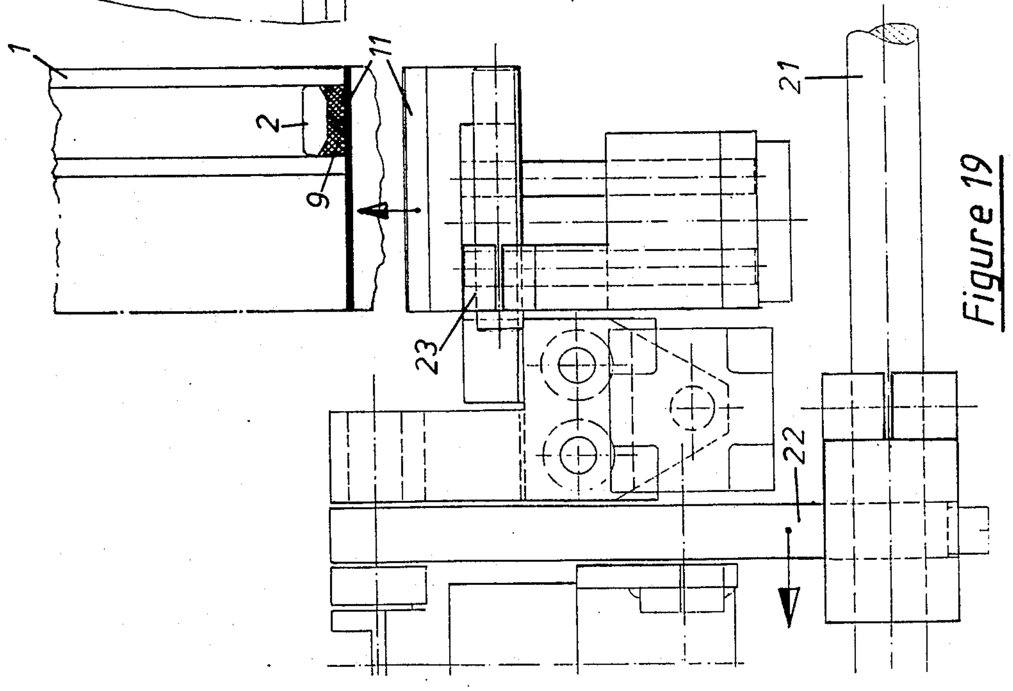

FIG. 19: A view of the arrangement as in FIG. 18, in the direction indicated by the arrow XIX.

Figure 20:
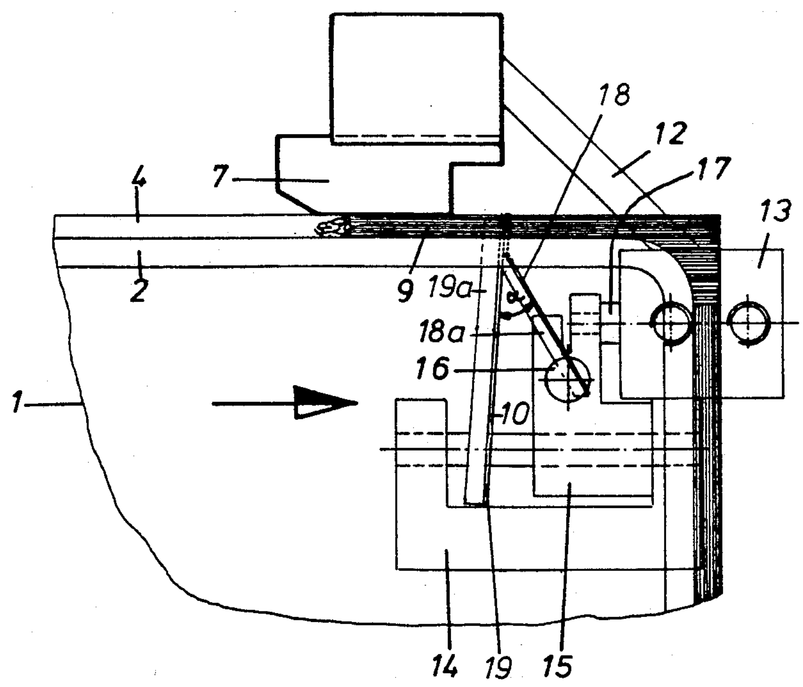

FIG. 20: A view as in FIG. 16, although with a covering and stripping plate arranged so as to be inclined to the plane of the plane of insulating glass.

In order to simplify the description, it is assumed that the pane of insulating glass that is to be sealed is arranged vertically or nearly so. The sequence of movements of the sealing nozzles and the covering and stripping plate does not change, however, if the pane of insulating glass is sealed when horizontal. The elements that bear, support, and move the pane of insulating glass are in the prior art: they have been omitted from the drawings appended hereto for purposes of simplification, since they are not essential for an understanding of the present invention.

The pane of insulating glass is formed from two single panes of glass that are connected to each other by a standoff frame 2 that is cemented between them. The edge length of the standoff frame is smaller than the edge length of the pane of insulating glass 1, so that an edge gap that extends round the outside is formed around the standoff frame 2, and the four sections 3 to 6 of this are filled with a sealing mass, which seals off the interior space of the pane of insulating glass so as to prevent the ingress of moisture. In the embodiment shown, the standoff frame 2 has rounded corners, which means that in the area of the four corners, the edge gap is considerably deeper than along the rectilinear sections of the standoff frame 2.

At the start of the sealing process, the pane of insulating glass is at rest. A first sealing nozzle 7 is applied to the frame of the pane of insulating glass in the area of the right-hand lower corner so as to inject sealing mass into the front section of edge gap. A covering and stripping plate 10, which moves with this sealing nozzle 7 is located in a non-working position beneath the pane of insulating glass 1 and behind its plane (FIG. 1).

Figure 2:
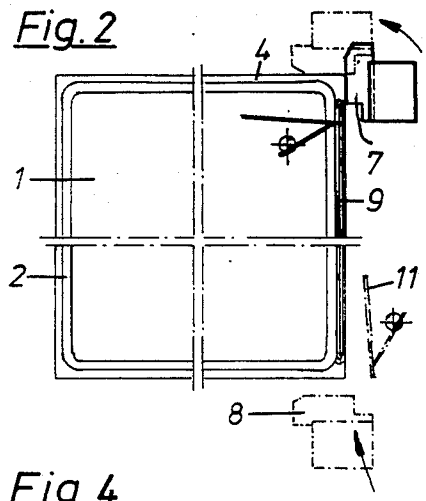
Figure 13:
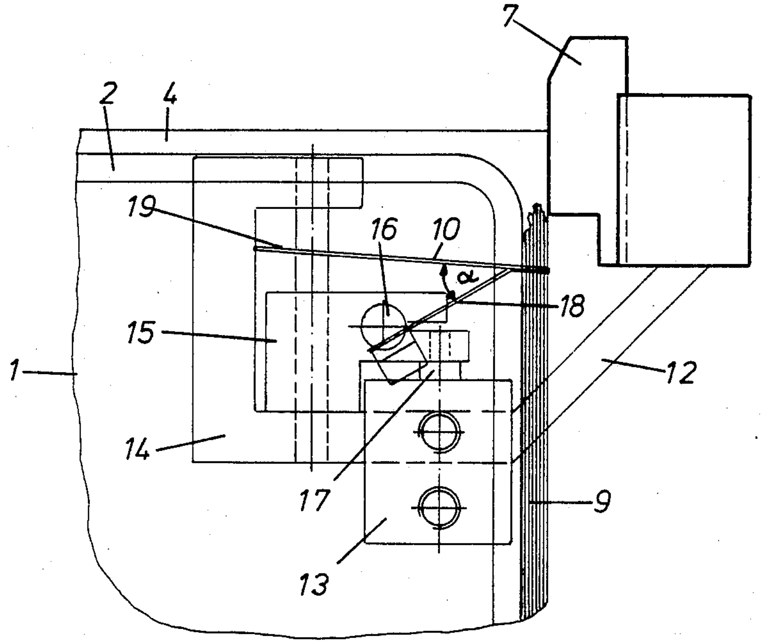

The first sealing nozzle 7 is now moved upwards on the front section 3 of edge gap during the simultaneous ejection of sealing mass 9, with the covering and stripping plate moving with it behind the pane of insulating glass (FIG. 2). When this happens, the sealing nozzle is so controlled that the string of sealing mass 9 begins slightly above the lower edge of the pane of insulating glass and ends a little below the upper edge of the pane of insulating glass. FIG. 2 shows the sealing nozzle 7 in the position in which its upward motion has been ended. A detailed view of the arrangement consisting of the sealing nozzle and the covering and stripping plant in this position is provided in FIG. 13; this drawing shows that the sealing nozzle 7 is connected by an arm 12 to a block 13. A stay 14 is attached to the block 13 at right angles to the plane of the pane of insulating glass so as to be able so slide. Within the stay 14, a clamping block 15 is arranged so as to be displaceable horizontally, parallel to the plane of the pane of insulating glass. The displacement of the clamping block can be effected, for example, by a pneumatic cylinder (not shown herein) that acts on the clamping block 15 through a horizontal rod 15. A rod 16 that extends perpendicularly to the plane of the pane of insulating glass is secured within the clamping block 15, and the covering and stripping plate 10 is secured to this rod 16. The covering and stripping plate is a sheet metal plate from which an arm 18 is cut and bent so as to subtend an acute angle $\alpha$ from the part 19 of the sheet, which is intended to lie on the edge of the pane of insulating glass. In FIG. 2 and FIG. 13 the covering and stripping plate 10, together with the block 13 and the stay 14, are still behind the pane of insulating glass 1. When the sealing nozzle is pivotted 90° counter-clockwise and brought to rest on the upper edge section 4, as is shown by the broken line in FIG. 2, the covering and stripping plate 10 together with the block 13 and the stay 14 are pivotted with it and are then in the position shown in FIG. 3, although still behind the plane of the pane of insulating glass 1.

Figure 3:
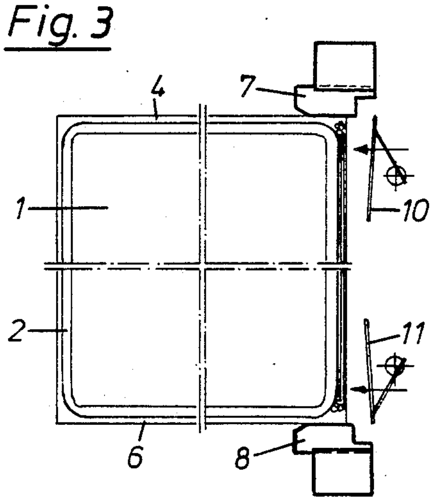
Figure 4:
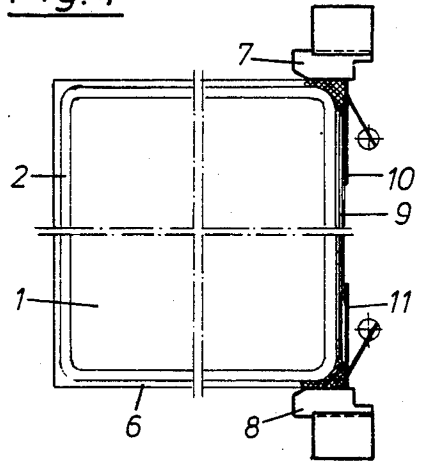
Figure 5:
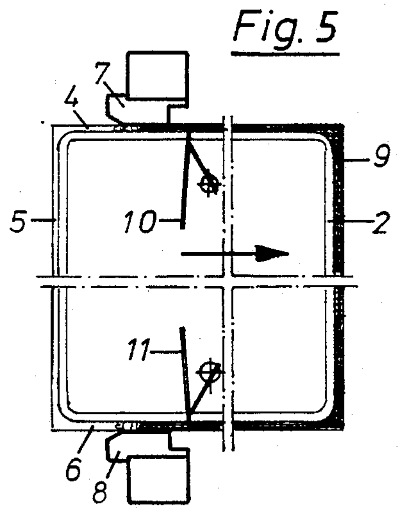
Figure 6:
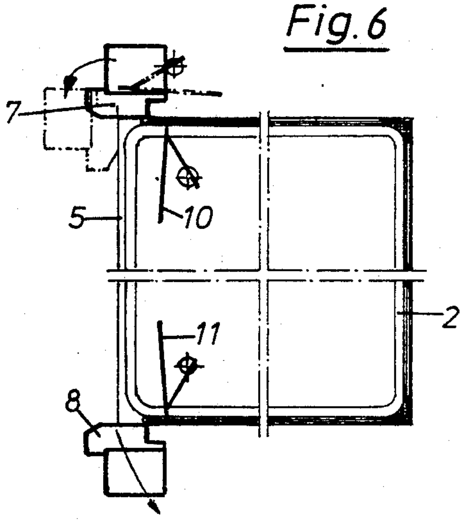
Figure 7:
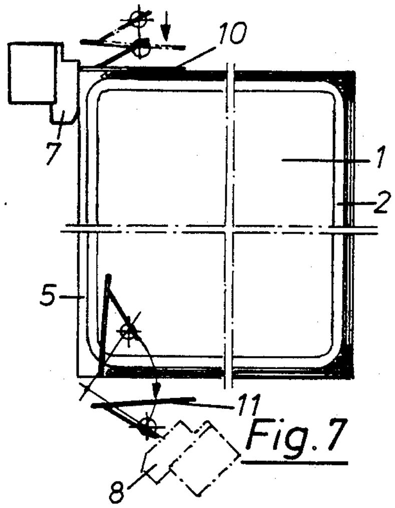
Figure 14:
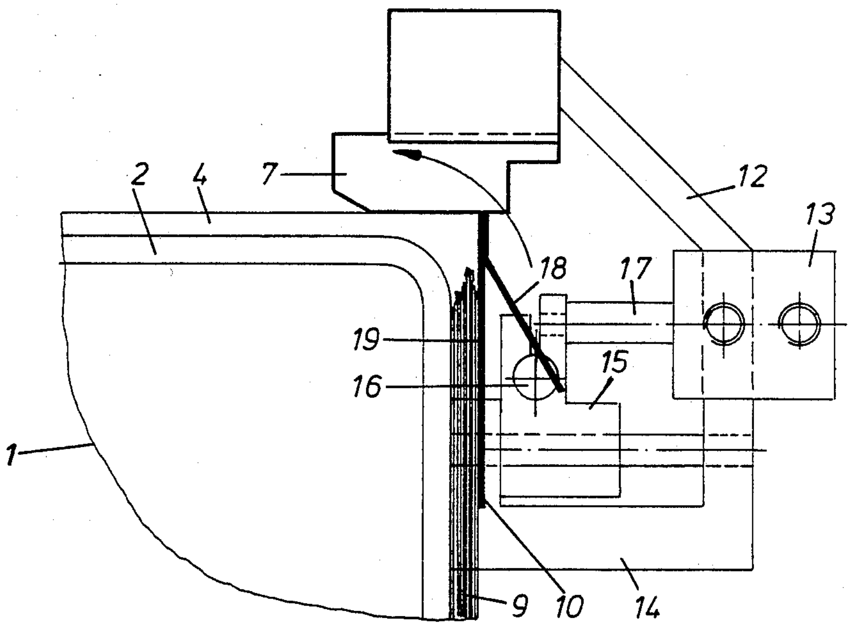
Figure 15:
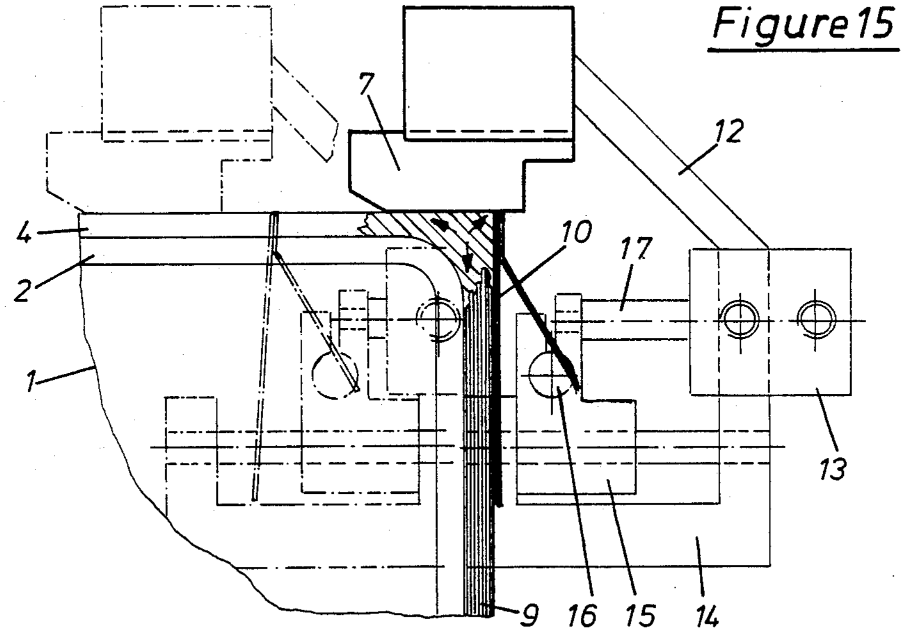

While the first sealing nozzle 7 is still moving upwards on the front edge gap section 3, but at latest when it is resting on the upper edge gap secton 4, a second sealing nozzle 8 is moved upwards from a non-working position beneath the pane of insulating glass 1 and applied to the lower edge gap section 6 in the area of the lower front corner. Thus, both the sealing nozzles 7 and 8 are in mirror image, identical positions on the beginning of the upper or lower edge gap sections, respectively, as is shown in FIG. 3. Now the covering and stripping plate 10 is advanced by the stay 14 being shifted from its position behind the plane of the pane of insulating glass, into a position in which it is opposite the front edge gap section 3 as in FIG. 3. At the same time, a second covering and stripping plate, which is associated with the front, lower corner is moved from a position behind the plane of the pane of insulating glass 1 (FIG. 2, shown by broken lines) into a position that is a mirror image of the first covering and stripping plate 10. From this position, both covering and stripping plates 10 and 11 are moved towards the front section 3 of the edge gap. In the case of the upper covering and stripping block this is done by shifting the clamping block 15 within the stay 14. There is a corresponding displacement system for the lower covering and stripping block 11. In this way, the covering and stripping plates 10 and 11 move into a sprung position on the edge of the pane of insulating glass and are moved along the edge of the pane of insulating glass by reducing the acute angle $\alpha$ until they come to rest against the front of the sealing nozzle 7 or 8, respectively; for the upper sealing nozzle 7, this position is shown in FIG. 14. In this position, sealing mass is now injected from the two sealing nozzles 7 and 8, which are not moved relative to the pane of insulating glass, into the area of the edge gap, at the lower and front corners. Since these areas are tightly covered by the front of the sealing nozzle and the covering and stripping plate, there is a build-up of sufficient pressure to permit the complete and bubble-free filling of the corner areas of the edge gap with sealing mass, without any resulting excess. FIGS. 4 and 15 show the state of affairs after these corner areas have been filled. Next, the two covering and stripping plates are moved at a right angle to the plane of the pane of insulating glass until they both lie completely behind this plane, and then one begins to move the pane of insulating glass 1 starts to move to the right (FIGS. 5 and 16), whereupon the emergence of the sealing mass from the two sealing nozzles 7 and 8 is delayed slightly relative to the start of movement of the pane of insulating glass. In this way, the upper edge gap section 4 and the lower edge gap section 6 are filled simultaneously with sealing mass during this pass. The movement of the pane of insulating glass ends shortly before the two strings of sealing mass 9 reach the rear edge of the pane of insulating glass. At the same time, the flow of sealing mass is cut off. This situation is shown in FIG. 6.

Figure 8:
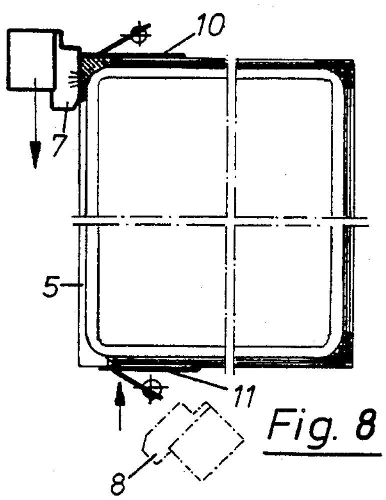

Now, the lower sealing nozzle 8 is moved back into its non-operating position beneath the pane of insulating glass 1 and the upper sealing nozzle 7 is swung—as at the front upper corner—through 90 counter-clockwise and brought to rest against the rear edge gap section (FIG. 7); next, the covering and stripping plate 10 is brought into contact with the upper edge gap section 4, as has already been described and then, with the sealing nozzle 7 stationary, the edge gap in the area of the rear upper corner is filled with sealing mass that is ejected briefly from the sealing nozzle (FIG. 8). Then the covering and sealing plate 10 is stripped from the edge of the pane of insulating glass, at which time there is no danger that sealing mass willl be pulled out of the edge gap, and the sealing nozzle 7 then begins to move downwards along the rear edge gap section 5, when once again the ejection of the sealing mass from the sealing nozzle is delayed slightly relative to the start of the movement of the sealing nozzle. The movement of the sealing nozzle 7 is ended shortly before the string of sealing mass 9 that is formed behind it reaches the lower edge of the pane. At the same time, the ejection of sealing mass is discontinued. This position is shown in FIG. 9.

Figure 9:
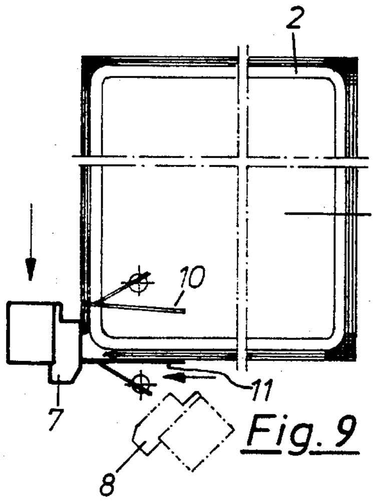
Figure 10:
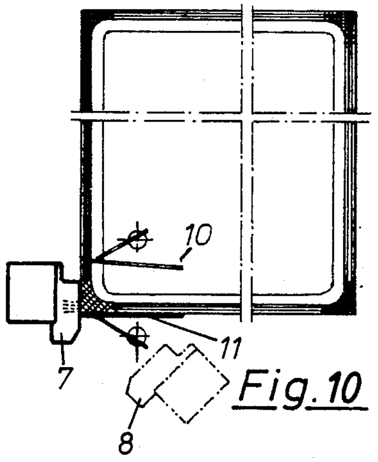
Figure 11:
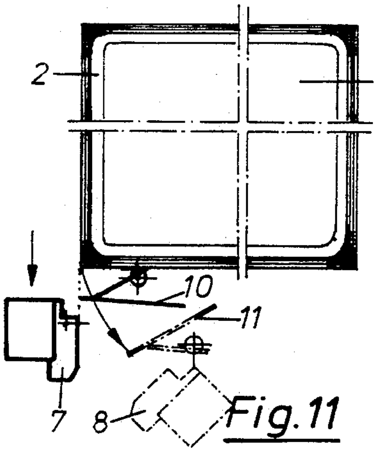
Figure 12:
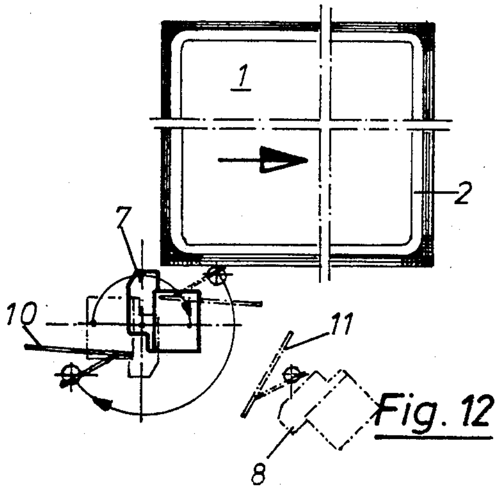

The lower covering and stripping plate that has been pivotted 90° clockwise in the meantime (FIG. 7) is now brought into position on the lower edge gap section 6, in the manner already described, when it comes into contact with the front of the sealing nozzle 7 (figure 9). In this position, a brief ejection of sealing mass from the sealing nozzle fills the edge gap in the area of the rear lower corner (FIG. 10). Next, the sealing nozzle is moved further downwards, at which time the edge of the covering and stripping plate that is resting against the front of the sealing nozzle prevents the sealing mass from hanging on the front of the sealing nozzle. Then, the covering and stripping plate 11 is removed from edge, perpendicularly to the plane of the pane of insulating glass, and lowered. The finished, sealed pane of insulating glass 1 can now be removed (FIG. 12) and the sealing nozzle 7 pivotted through 180° so as to be oriented as is shown in FIG. 1.

FIGS. 17 to 19 provide a detailed view of the arrangement of the sealing nozzle 7 and the two covering and stripping plates 10 and 11 during sealing of the pane of insulating glass in the area of the rear lower corner. The standoff frame in the pane of insulating glass is not shown in FIG. 17 in order to simplify the illustration. FIG. 17 shows—broken lines—the sealing nozzle 7 and its associated covering and sealing plate 10 as it approaches the rear lower corner and—continuous lines—its end position. In addition, FIG. 17 shows the lower covering and stripping plate 11—broken lines—before it rests on the lower edge gap section 6 and—in full lines—after coming to rest on the edge of the pane of insulating glass. The arrows indicate the direction in which the covering and stripping plate can be moved.

In FIGS. 18 and 19 the lower covering and stripping plate 10 is shown in thin lines together with the elements of its activating system, in the position in which it is opposite but not on the lower edge gap section 6. The thick lines show the position of the covering and stripping plate 11 once it has come to rest on the edge gap section 6. It can be seen that, in order to move the lower covering and stripping plate 11, there are appropriate elements, as for the upper covering and stripping plate, namely a block 20 that is arranged so as to be able to slide on a rod 21 that is perpendicular to the plane of the pane of insulating glass 1. An arm 22 is secured to this block 20, and a clamping block 23 is attached to this parallel to the plane of the pane of insulating glass so as to be movable up and down. The covering and stripping plate 11 is secured in this clamping block in a manner similar to the upper covering and stripping block 10. The covering and stripping plate 11 can be swung downwards into its non-working position beneath the pane of insulating glass 1 by pivotting the arm 22 about the rod 21.

Figure 16:
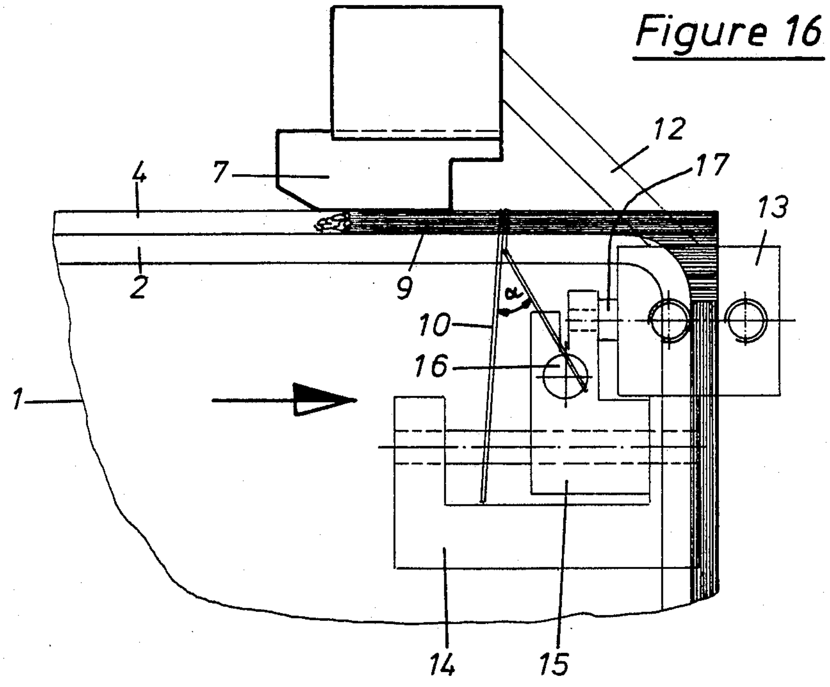

FIG. 20 is modified compared to FIG. 16 in that the covering and stripping element 10 is so arranged as to be inclined towards the plane of the pane of insulating glass 1. This can be seen from the fact that in each instance, the front side 19*a* or 18*a*, respectively, can be seen both of the plate 19 that is intended to lie on the edge of the plane of insulating glass 1 and of the arm 18 that extends at an acute angle from this. The inclined position is achieved in that the rod 16, on which the arm 18 is secured, has a contact surface that is suitably inclined to the plane of the pane of insulating glass 1 in place of a contact surface for the arm 18 that is perpendicular to the plane of the pane of insulating glass 1. A deviation of 5 to 10 from the perpendicular on the plane of the pane of insulating glass 1 is sufficient for the intended purpose. The inclination is so selected that on being removed from the edge, the stripper plate 19 can then be cleanly stripped on the last-coated outer edge of the glass if the edge of this glass projects slight farther forward than that of the adjacent single pane of glass. In FIG. 20, the stripper plate 19 is withdrawn behind the plane of the drawing and for this reason moves on the rearmost, outer edge of the glass.

I claim:

1. A process for sealing rectangular panes of insulating glass by injecting a paste-like sealing mass into the four sections of an edge gap that is formed on the outside of a standoff frame between the individual panes of glass, this being done by applying a sealing nozzle to the edge of the pane of insulating glass such that it covers a certain length of the edge gap, and guiding the sealing nozzle along the edge of the pane of insulating glass while simultaneously ejecting the sealing mass from the sealing nozzle, while sealing the panes of insulating glass in the area of each of its four corners, covering respective ones of the edge gap sections that are associated with the respective corners, beginning from said corner to a prescribed length by means of a covering and stripping plate, while the sealing nozzle is applied to the other edge gap section that is associated with the same corner, and withdrawing the covering and stripping plate at a later time once again from the edge of the pane of nsulating glass perpendicularly to the plane of said pane of insulating glass, characterized in that during sealing of each of the four corners of the pane of insulating glass the previously sealed edge gap section in the area of the respective corner is covered by such a covering and stripping plate and thereafter the sealing mass is injected into the corner area of the edge gap that is tightly covered by the sealing nozzle while the covering and stripping plate abuts against the sealing nozzle as long as the sealing nozzle is stationary on the pane of insulating glass and thereafter the covering plate is withdrawn from the edge of the pane of insulating glass.

2. A process as defined in claim 1, in which the sealing mass is injected into the four sections of the edge gap by said sealing nozzle that is moved relative to the pane of insulating glass only to a point shortly before the end of the particular edge gap section.

3. A process as defined in claim 2, in which injecting the sealing mass into the first edge gap section is started just after the beginning of this edge gap section.

4. A process as defined in claim 1, wherein in order to seal the pane of insulating glass in the area of its corners, at first the sealing nozzle is brought into its sealing position, in which it is stationary, and then the covering and stripping plate that is associated with the sealing nozzle is brought into its covering position, in which it rests on the edge of the pane of insulating glass and abuts against the front of the nozzle.

5. A process as defined in claim 4, wherein at first, the covering and stripping plate is applied to the edge of the pane of insulating glass and then the covering and stripping plate is allowed to slide along the edge, until it comes to rest against the sealing nozzle.

6. A process as defined in claim 1, wherein after sealing the pane of insulating glass in the area of the first, second, or third corner at the start of the relative movement between the sealing nozzle and the pane of insulating glass, the ejection of the sealing mass from the sealing nozzle is initiated after a delay.

7. A process as defined in claim 1, wherein the covering and stripping plate is resiliently placed against the edge of the pane of insulating glass so as to distribute the spring forces along the extent of the covering and stripping plate that runs transversely to the plane of the pane of insulating glass such that at least when the edges align exactly on the particular section of the edge gap of the pane of insulating glass the greatest application force will be exerted on that particular edge of the pane of insulating glass over which the covering and stripping plate is moved last.

8. A tool arrangement consisting of a sealing nozzle and a covering and stripping plate, for carrying out the process as defined in one of the preceding claims, wherein the covering and stripping plate is arranged on a carrier that follows the movements of the sealing nozzle.

9. A tool arrangement as defined in claim 8, wherein the covering and stripping plate can be moved on its carrier both at a right-angle to the plane of the pane of insulating glass and in the plane of the pane of insulating glass.

10. A tool arrangement as defined in claim 8, wherein the covering and stripping plate consists of a part that is intended to rest on the edge of the pane of insulating glass and an arm that extends from this at an acute angle ($\alpha$) and can be sprung out relative to the part.

11. A tool arrangement as defined in claim 10, wherein the arm and the part are components of an angle plate.

12. A tool arrangement as defined in claim 10, wherein an activating device for the covering and stripping plate acts on the end of the arm that protrudes from the part, transversely to the surface of this; and wherein the tip of that acute angle ($\alpha$) is directed towards the sealing nozzle.

13. A tool arrangement as defined in claim 10, wherein the part that is intended to rest on the edge of the pane of insulating glass, when in its unloaded state, subtends an angle of other than 90° with its flat front to the plane of the pane of insulating glass, such that the section of the part which is at the front when withdrawn from the edge of the pane of insulating glass, relative to the direction of withdrawal, immediately prior to coming to rest on the edge of the pane of insulating glass, is closer to the edge of the pane of insulating glass than the section of the part that is further to the rear, relative to the direction of withdrawal.

14. A tool arrangement as defined in claim 9, wherein an activating device for the covering and stripping plate acts on the end of the arm that protrudes from the part, transversely to the surface of this; and wherein the tip of that acute angle 60 is directed toward the sealing nozzle.

15. A device for sealing rectangular panes of insulating glass by injecting a paste-like sealing mass into the four sections of an edge gap that is formed on the outside of a standoff frame between the individual panes of glass, comprising a support structure for supporting the panes, a sealing nozzle which is associated with the support structure and which is movable relative to the pane along the edge thereof and has a surface surrounding the nozzle discharge orifice covering said edge gap along a certain length thereof, a covering and stripping plate mounted at said support structure for covering an edge gap of the pane, said plate being movable so that it can be withdrawn from the edge of the pane perpendicularly to the plane of said pane, characterized in that the covering and stripping plate is arranged on a carrier that follows the movements of the sealing nozzle.

* * * * *